J. C. Dietrich,
Buck Saw Frame
No. 113,639. Patented Apr. 11, 1871.

Witnesses:
J. R. Hopper
D. L. Johnston

Inventor:
J. C. Dietrich
By W. S. Loughborough & Co
Attys

United States Patent Office.

JEROME C. DIETRICH, OF ROCHESTER, NEW YORK.

Letters Patent No. 113,639, dated April 11, 1871.

IMPROVEMENT IN BUCK-SAW FRAMES.

The Schedule referred to in these Letters Patent and making part of the same.

I, JEROME C. DIETRICH, of Rochester, in the county of Monroe and State of New York, have invented certain Improvements in "Buck-Saw Frames," of which the following is a specification.

My invention consists chiefly in attaching the straining-rod of a saw-frame to the extremity of the saw, and the use in connection therewith of a brace, which assists in straining the saw, and also stiffens the frame.

In the drawing—

Figures 1, 2:
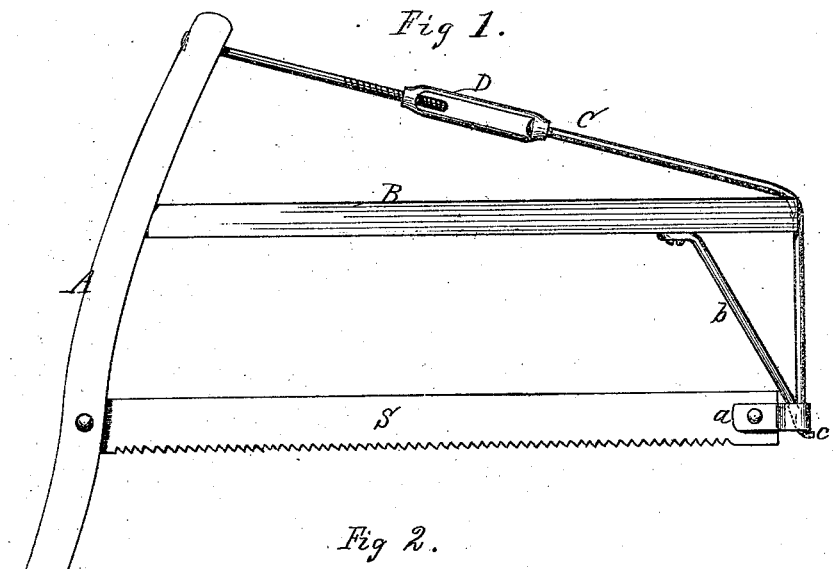
Figure 1 is a side elevation of my invention.
Figure 2 is a sectional view of a modification of the saw attachment.

The hand-bar A and stretcher B are similar to those of an ordinary saw-frame, and the saw is attached to the former by a pin or rivet in the usual manner.

The straining-rod C is secured to the extremity of the bar A, and is made of sufficient length to bend over the end of the stretcher and pass down through an eye or loop-strap, $a$, riveted or otherwise secured to the outer end of the saw.

One extremity of a diagonal brace, $b$, is made fast to the stretcher B, and the other is connected to the straining-rod at or near its lower end.

This latter attachment may be made by welding the two together, as indicated in fig. 1, or the straining-rod may extend through an eye in the end of the brace, as shown in fig. 2, an enlargement, $d$, on the former retaining the latter.

The loop-strap $a$ embraces both these, and rests upon a lip, $c$, formed either upon the brace or straining-rod, thus constituting a support for the end of the saw, and the opening in the strap $a$ is such as to admit the lip and rods $b$ and $c$ readily when the saw is being attached to the frame.

A straining-nut or swivel, D, is provided upon the rod C, constructed and operating in the usual manner.

It will be observed that the brace $b$ is forced outward by the draft of the straining-rod, its upper end being the fulcrum about which it moves, such action of the rod and brace straining the saw to the requisite tension.

The brace also serves to stiffen the frame in the direction of the thrust of the operator, while, by the peculiar form and arrangement of the straining-rod the usual back-bar of the frame is dispensed with.

The straining-rod rests in a groove in the extremity of the stretcher B, and being quite small in diameter, the draft upon it, caused by the nut D, bends it about this point, in the act of straining the saw.

By my invention I obtain a strong saw-frame, which is lighter and less bulky than the ordinary frame. while its cost is no greater.

I am aware of the patent granted to Augustus Pruyn, dated September 11, 1860, for buck-saw frame, and I do not claim any of the parts therein shown or described; but

What I claim as my invention is—

A buck-saw frame, composed of the handle A, continuous straining-rod C D, stretcher B, and brace $b$, constructed, arranged, and operating substantially in the manner set forth.

JEROME C. DIETRICH.

Witnesses:
F. H. CLEMENT,
GEO. T. PARKER.